US012551181B2

(12) United States Patent
Manhart

(10) Patent No.: US 12,551,181 B2
(45) Date of Patent: Feb. 17, 2026

(54) PROVIDING A 3D IMAGE DATASET

(71) Applicant: Siemens Healthcare GmbH, Erlangen (DE)

(72) Inventor: Michael Manhart, Fürth (DE)

(73) Assignee: Siemens Healthineers AG, Forchheim (DE)

(*) Notice: Subject to any disclaimer, the term of this patent is extended or adjusted under 35 U.S.C. 154(b) by 236 days.

(21) Appl. No.: 18/481,108

(22) Filed: Oct. 4, 2023

(65) Prior Publication Data

US 2024/0130704 A1 Apr. 25, 2024
US 2024/0225583 A9 Jul. 11, 2024

(30) Foreign Application Priority Data

Oct. 21, 2022 (DE) .................... 10 2022 211 162.1

(51) Int. Cl.
*A61B 6/00* (2024.01)
*A61B 6/06* (2006.01)
*A61B 6/40* (2024.01)
*G16H 30/20* (2018.01)
*G16H 30/40* (2018.01)
*G16H 50/20* (2018.01)

(52) U.S. Cl.
CPC ............. *A61B 6/5258* (2013.01); *A61B 6/06* (2013.01); *A61B 6/4035* (2013.01);
(Continued)

(58) Field of Classification Search
CPC ....... A61B 6/5258; A61B 6/06; A61B 6/4035; A61B 6/5205; A61B 6/032; A61B 6/4441;
(Continued)

(56) References Cited

U.S. PATENT DOCUMENTS

2010/0246752 A1 9/2010 Heuscher
2014/0177782 A1* 6/2014 Herold ................... A61B 6/032
378/4

FOREIGN PATENT DOCUMENTS

DE 102008049695 A1 4/2010
DE 102011080607 A1 2/2013
(Continued)

OTHER PUBLICATIONS

Hatamikia, S. et al. "Source-detector trajectory optimization in cone-beam computed tomography: a comprehensive review on today's state-of-the-art", in: 2022 Phys. Med. Biol. in press. https://doi.org/10.1088/1361-6560/ac8590, (2022), pp. 1-36.
(Continued)

*Primary Examiner* — Courtney D Thomas
(74) *Attorney, Agent, or Firm* — Lempia Summerfield Katz LLC

(57) ABSTRACT

A computer-implemented method for providing a 3D image dataset includes identifying an acquisition plan and an acquisition trajectory. The method further includes determining a collimator configuration of a collimation unit for each acquisition positioning, wherein each collimator configuration specifies a spatial arrangement of at least one filter element of the collimation unit such that: X-ray radiation that is emitted by the X-ray source and illuminates a detector row without earlier passing through the volume of interest is filtered, and X-ray radiation that is emitted by the X-ray source and illuminates at least part of a detector row after passing through the volume of interest is transmitted. The method further includes acquiring the X-ray projection images of the object under examination, wherein the collimation unit is adjusted based on the collimator configurations; providing the 3D image dataset by reconstruction from the X-ray projection images.

16 Claims, 6 Drawing Sheets

(52) U.S. Cl.
CPC .......... *A61B 6/5205* (2013.01); *G16H 30/20* (2018.01); *G16H 30/40* (2018.01); *G16H 50/20* (2018.01)

(58) Field of Classification Search
CPC ....... A61B 6/4021; A61B 6/42; A61B 6/4266; A61B 6/466; A61B 6/5217; A61B 6/5223; G16H 30/20; G16H 30/40; G16H 50/20
See application file for complete search history.

(56) References Cited

FOREIGN PATENT DOCUMENTS

| | | |
|---|---|---|
| DE | 102012205238 A1 | 10/2013 |
| DE | 102021210314 A1 | 3/2022 |

OTHER PUBLICATIONS

Herl G. et al., "Scanning trajectory optimisation using a quantitative Tuybased local quality estimation for robot-based X-ray computed tomography", Nondestructive Testing and Evaluation, ISSN: (Print) (Online) Journal, https://www.tandfonline.com/doi/full/10.1080/10589759.2020.1774579, (2020), pp. 287-303.

Reynolds, T. et al. "Extended Intraoperative Longitudinal 3-Dimensional Cone Beam Computed Tomography Imaging With a Continuous Multi-Turn Reverse Helical Scan.", in: Investigative Radiology (2022): 10-1097, pp. 1-9.

Schafer, Sebastian et al. "Filtered region of interest cone-beam rotational angiography" Medical Physics, vol. 37, No. 2, pp. 694-703, Feb. 2010, pp. 1-10.

* cited by examiner

PROVIDING A 3D IMAGE DATASET

The present patent document claims the benefit of German Patent Application No. 10 2022 211 162.1, filed Oct. 21, 2022, which is hereby incorporated by reference in its entirety.

TECHNICAL FIELD

The disclosure relates to a computer-implemented method for providing a three-dimensional (3D) image dataset, to a medical X-ray device, and to a computer program product.

BACKGROUND

Collimation of X-rays, in particular spatial bounding and/or focusing of the X-rays by a diaphragm, may be employed to reduce an X-ray dose when acquiring X-ray projection images. For 3D imaging of an object under examination, it is common to acquire a plurality of X-ray projection images of the object under examination along an acquisition trajectory from different X-ray projection directions, in particular angulations, for instance in order to monitor neurological, oncological, and/or surgical interventions. Robotic acquisition trajectories, for example, known from the document by T. Reynolds et al., "Extended Intraoperative Longitudinal 3-Dimensional Cone Beam Computed Tomography Imaging With a Continuous Multi-Turn Reverse Helical Scan," Investigative Radiology (2022), 10-1097, may facilitate an extension of a longitudinal image region, which is advantageous, for example, for imaging a spine of the object under examination, in particular during surgical interventions. Further methods for optimizing acquisition trajectories are known, for example, from the documents by S. Hatamikia et al., "Source-detector trajectory optimization in cone-beam computed tomography: a comprehensive review on today's state-of-the-art," Phys. Med. Biol., 2022, 67, 16TR03, and G. Herl et al., "Scanning trajectory optimisation using a quantitative Tuybased local quality estimation for robot-based X-ray computed tomography," Nondestructive Testing and Evaluation, 2020, 35:3, 287-303. Such longitudinal trajectories are commonly associated with an additional X-ray dose, and also irradiation of tissue of the object under examination that is not needed for the imaging of a volume of interest. It may be challenging to collimate the X-rays for a 3D trajectory, especially when the volume of interest is not positioned in the isocenter. In addition, it may not be possible to implement such 3D trajectories because of potential collisions. Furthermore, the collimation, in particular if the collimation results in incomplete illumination of the detector rows of an X-ray detector for detecting the X-rays, may lead to truncation artifacts in the reconstructed slice images and to incorrect image values, in particular values in Hounsfield units (HU). In this case, an algorithmic correction may only be possible as an approximation. In addition, the collimation may have to be adjusted manually by a medical operator before acquiring the 3D image, which means additional effort and, in some instances, sub-optimum and/or error-prone collimation.

SUMMARY AND DESCRIPTION

Therefore, an object of the present disclosure is to facilitate low X-ray-dose and low-artifact 3D imaging of a volume of interest of an object under examination.

The scope of the present disclosure is defined solely by the appended claims and is not affected to any degree by the statements within this summary. The present embodiments may obviate one or more of the drawbacks or limitations in the related art.

In a first aspect, the disclosure relates to a computer-implemented method for providing a 3D image dataset. In act a), an acquisition plan is identified including information relating to a volume of interest to be imaged of an object under examination and relating to an acquisition trajectory. The acquisition trajectory specifies a plurality of acquisition positionings of an acquisition arrangement for acquiring X-ray projection images of the object under examination. The acquisition arrangement includes an X-ray source, an X-ray detector, (e.g., a flat-panel detector), and a collimation unit. The X-ray detector has a plurality of detector rows, wherein each row includes a plurality of detector pixels. In act b), a collimator configuration of the collimation unit is determined for each of the acquisition positionings of the acquisition arrangement. Each collimator configuration specifies a spatial arrangement of at least one filter element of the collimation unit such that X-ray radiation that may be emitted by the X-ray source and illuminate a detector row without earlier passing through the volume of interest is filtered, (e.g., by the collimation unit), and such that X-ray radiation that may be emitted by the X-ray source and illuminate at least part of a detector row after passing through the volume of interest is transmitted, (e.g., by the collimation unit). In act c), the X-ray projection images of the object under examination are acquired by the acquisition arrangement in accordance with the acquisition plan. In this process, the collimation unit is adjusted based on the collimator configurations. In act d), the 3D image dataset is provided by reconstruction from the X-ray projection images.

Advantageously, the acts of the proposed method may be computer-implemented at least in part, in particular in full.

The identifying of the acquisition plan may include receiving and/or determining the acquisition plan. The receiving of the acquisition plan may include capturing and/or reading a computer-readable data storage medium and/or receiving from a data storage unit, for example, a database. Alternatively, or additionally, the acquisition plan may be captured by user input by a medical operator. The determining of the acquisition plan may be carried out, for example, based on pre-captured planning image data, initial X-ray projection images, and/or a patient model of the object under examination.

Advantageously, the acquisition plan may include the information relating to the volume of interest (VOI) to be imaged, (e.g., a spatial region and/or a volume and/or anatomical object), of the object under examination. For example, the object under examination may include a human and/or animal patient and/or an examination phantom. In particular, the acquisition plan may have a segmentation and/or an annotation and/or a marking and/or positioning information relating to the volume of interest to be imaged, e.g., in pre-captured planning image data, in at least one first X-ray projection image, and/or in a planning model of the object under examination. Furthermore, the acquisition plan may include information relating to the acquisition trajectory. The acquisition trajectory may specify the plurality of acquisition positionings, in particular spatial positions and/or orientations, in particular angulations, and/or poses, of the acquisition arrangement. In particular, the acquisition trajectory may specify a sequence in time of the plurality of acquisition positionings for acquiring the X-ray projection images of the object under examination by the acquisition arrangement. The acquisition positionings may specify focus positions for the X-ray source.

The acquisition arrangement may include the X-ray source, the X-ray detector, and the collimation unit in a defined arrangement. In particular, the X-ray source and the X-ray detector may be arranged opposite one another, for instance on a C-arm and/or on a gantry, so that X-rays, in particular X-ray radiation, emitted by the X-ray source may illuminate an X-ray sensitive surface of the X-ray detector. The collimation unit may advantageously be arranged, in particular fastened, on the X-ray source, and/or integrated at least partially in the X-ray source. The at least one filter element may be capable of being introduced into a beam path of the X-ray source.

The X-ray detector may have a plurality of detector rows, which may be arranged in parallel and/or in a plane and/or along a surface and/or equidistantly, each row including a plurality of detector pixels, in particular sensor elements. The detector rows may have an identical or different number of detector pixels. In particular, the plurality of detector rows may form an array of detector pixels. Each pixel of the plurality of detector pixels may be configured to capture X-rays and to provide a capture signal according to the captured X-rays, in particular in order to provide the X-ray projection images.

Advantageously, in act b), a collimator configuration of the collimation unit may be determined, in particular automatically, for the acquisition positionings in each case, in particular for each of the acquisition positionings, of the acquisition arrangement. The collimator configurations may each specify a spatial arrangement, in particular a positioning, of the at least one filter element of the collimation unit with respect to the X-ray source, in particular to a beam path of the X-ray source. The positioning of the at least one filter element may describe a spatial position, in particular relative position, and/or orientation of the at least one filter element with respect to the X-ray source. The at least one filter element may include at least one non-transparent, in particular X-ray opaque, filter element, which is configured to filter, in particular to block, X-ray radiation at least partially, in particular completely. For example, the at least one non-transparent filter element may be made of a metal, in particular lead and/or aluminum. Advantageously, the at least one filter element, in particular the at least one non-transparent filter element, may be insertable into the beam path of the X-ray source at least partially, in particular completely, for the purpose of filtering X-ray radiation that may be emitted by the X-ray source. The collimator configurations may include collimation of the X-ray radiation by row, in particular bounded on two sides along a spatial dimension, and/or by column, in particular bounded on two sides parallel to the spatial dimension. In addition, the collimator configurations may include identification of at least one filter element to be used from a selection of a plurality of different filter elements. The plurality of filter elements may here differ in terms of a geometric property, for instance an arrangement of holes and/or a hole size, in particular a diameter, and/or a material property. The at least one filter element may be arranged on the X-ray source, in particular in the beam path between X-ray source and X-ray detector, such that it may be moved and/or replaced manually or automatically.

The determining of the collimator configurations may include virtual ray tracing, taking into account a relative positioning of the X-ray source with respect to the volume of interest.

Advantageously, the collimator configurations for the acquisition positionings of the acquisition unit that are specified by the acquisition plan may be determined such that the at least one filter element filters, in particular blocks, the X-ray radiation that may be emitted by the X-ray source, which X-ray radiation illuminates a detector row, in particular a plurality of detector rows, without earlier passing through the volume of interest. In particular, the collimator configurations may specify the spatial arrangement of the at least one filter element for each of the acquisition positionings such that the X-ray radiation that may be emitted by the X-ray source and, passing outside the volume of interest, completely illuminates a detector row, in particular a plurality of detector rows, of the X-ray detector, is filtered.

In addition, the collimator configurations for the acquisition positionings specified by the acquisition plan may be determined such that the X-ray radiation that may be emitted by the X-ray source and illuminate at least part of a detector row after passing through the volume of interest is transmitted, in particular unimpeded or partially filtered. In particular, the collimator configurations may specify the spatial arrangement of the at least one filter element for each of the acquisition positionings such that the X-ray radiation that may be emitted by the X-ray source and illuminate at least one detector pixel of a detector row after passing through the volume of interest is transmitted row by row.

In act c), the X-ray projection images of the object under examination are acquired by the acquisition arrangement in accordance with the acquisition plan. For this purpose, the acquisition arrangement may be arranged, in particular sequentially in time, along the acquisition trajectory. The arranging of the acquisition arrangement along the acquisition trajectory may include a translation and/or rotation of the acquisition arrangement with respect to the object under examination. The X-ray source may emit at each of the acquisition positionings an X-ray beam for passing through the volume of interest and for illuminating the X-ray detector. In this process, the collimation unit, in particular the arrangement of the at least one filter element, may be adjusted according to the collimator configurations at the acquisition positionings of the acquisition trajectory. The X-ray detector, in particular the detector pixels, may provide the capture signal according to the detected X-rays. The X-ray projection images may be received by the capture signal.

Thereafter, the 3D image dataset may be reconstructed from the X-ray projection images, for instance by filtered back projection. The providing of the 3D image dataset may include storing on a computer-readable storage medium and/or displaying a graphical depiction of the 3D image dataset by a display unit and/or transferring to a provider unit.

The proposed bounding, in particular focusing, of the X-ray radiation onto the volume of interest by the collimator configurations may advantageously facilitate low X-ray-dose and low-artifact 3D imaging of the object under examination. The, in particular automated, determining of the collimator configurations in act b) may facilitate consistent and optimized collimation according to the ALARA radiation protection principle ("As Low As Reasonably Achievable" principle). In addition, by reducing, in particular avoiding, manual user interaction, the workflow for acquiring the X-ray projection images may be improved, in particular with regard to safety of the object under examination.

In a further advantageous embodiment of the proposed method, the collimation unit has at least one at least semi-transparent filter element and at least one non-transparent filter element. The X-rays are filtered by the at least one non-transparent filter element and transmitted by the at least one at least semi-transparent filter element.

Advantageously, the collimation unit may have at least one at least semi-transparent filter element, in particular a plurality of at least semi-transparent filter elements, and at least one non-transparent filter element, in particular a plurality of non-transparent filter elements. The filter elements may have an identical or different geometry, for instance shape. The at least one non-transparent filter element may be substantially completely non-transparent to X-rays, in particular X-ray opaque. The at least one at least semi-transparent filter element may be at least partially, in particular completely, transparent to X-rays. X-ray radiation emitted by the X-ray source may be transmitted through the at least one at least semi-transparent filter element at least partially, in particular completely, in such a way that a portion of the X-ray radiation after interaction with the object under examination illuminates the X-ray detector, which portion is sufficient for capturing, in particular depicting, a structure of an anatomy of the object under examination, for instance a bone structure and/or a high-contrast object. In this case, regions of the X-ray detector that are illuminated by semi-transparently collimated X-ray radiation may have a lower signal-to-noise ratio (SNR) than regions illuminated with completely transparently collimated X-ray radiation, and a lower X-ray dose. As a result, soft-tissue regions of the object under examination may be imaged with a higher noise component and lower X-ray dose. Advantageously, the collimator configurations may specify a spatial arrangement for the, in particular at least semi-transparent and non-transparent, filter elements at each of the acquisition positionings of the acquisition unit. The at least one at least semi-transparent filter element and/or the at least one non-transparent filter element may be insertable into the beam path of the X-ray source at least partially, in particular completely.

Advantageously, as part of a system calibration of the acquisition arrangement, intensity calibrations may have been carried out with and without full transparent collimation. This may facilitate consistent determination of line integrals from the non-collimated and at least semi-transparently collimated regions for 3D reconstruction of the 3D image dataset from the X-ray projection images.

In a further advantageous embodiment of the proposed method, the collimation unit may have a plurality of filter elements. The collimator configurations in this case may each specify a relative positioning of the plurality of filter elements.

Advantageously, the collimation unit may have a plurality of filter elements that may be identical or different, for instance at least semi-transparent and non-transparent. The collimator configurations may specify for each of the acquisition positionings of the acquisition arrangement a relative positioning, for instance a relative position and/or a relative orientation, of the plurality of filter elements with respect to one another and/or with respect to the beam path of the X-ray source.

This may facilitate improved geometric adaptation of a transmission region bounded by the, in particular non-transparent, filter elements, to a geometry of the volume of interest. In addition, this may facilitate a further decrease in the X-ray dose and reduction in truncation artifacts.

In a further advantageous embodiment of the proposed method, act a) may include receiving pre-captured planning image data and/or a planning model of the object under examination. The volume of interest and/or the acquisition trajectory may be determined in this case based on the planning image data and/or the planning model.

The receiving of the pre-captured planning image data and/or the planning model of the object under examination may include capturing and/or reading a computer-readable data storage medium and/or receiving from a data storage unit, for example, a database. Furthermore, the planning image data and/or the planning model may be provided by a provider unit of a medical imaging device. The pre-captured planning image data may include a spatially resolved image, in particular spatially resolved in two dimensions (2D) and/or three dimensions (3D) of the object under examination, in particular of the volume of interest. In addition, the planning image data may be resolved in time. The medical imaging device for acquiring the planning image data may include a medical X-ray device, in particular a C-arm X-ray device and/or cone-beam computed tomography (CBCT) device, and/or a computed tomography system (CT system) and/or a magnetic resonance tomography system (MRT system) and/or an ultrasound device and/or a positron emission tomography system (PET system). In particular, the planning image data may have been acquired by the acquisition arrangement. The planning model may advantageously include a 2D and/or 3D spatially resolved representation, (for example, a volumetric model, in particular a volumetric net model), and/or a skeletonized model, of the object under examination, in particular of the volume of interest. The planning model may include a generic and/or statistical patient model. The patient model may advantageously be configured to the object under examination, in particular to the volume of interest, for example, based on patient data and/or camera images, in particular 3D camera images, and/or planning image data, in particular X-ray image data, of the object under examination. Advantageously, the planning image data and/or the planning model may be registered with a coordinate system of the acquisition arrangement.

Advantageously, the volume of interest may be determined, in particular identified, based on the planning image data and/or the planning model. The determining of the volume of interest may include identifying, in particular segmenting and/or marking and/or annotating and/or highlighting, in the planning image data and/or in the planning model a representation, in particular an image and/or a model, of an anatomical object and/or of an anatomical structure of the object under examination and/or of a medical object in the object under examination. In particular, a spatial region in the object under examination may be determined as the volume of interest based on the planning image data and/or the planning model. For example, an object, for instance a medical object, in particular an implant and/or a medical instrument, that is arranged in or on the object under examination and may cause an artifact, for example a scattered radiation artifact and/or a metal artifact, in the X-ray projection images to be acquired, may be identified in the planning image data and/or the planning model. Furthermore, the volume of interest may be determined such that the object is arranged in a spatial center of the volume of interest. For example, the collimator configurations may be determined from the acquisition trajectory, in particular from an acquisition geometry, and from the information relating to the volume of interest to be imaged, in particular the annotation of the volume of interest, for example in the planning image data and/or the planning model, in particular in a 3D representation of the object under examination.

Alternatively, or additionally, the acquisition trajectory, in particular the plurality of acquisition positionings, may be determined based on the planning image data and/or the planning model. Advantageously, the acquisition trajectory may be determined based on the planning image data and/or the planning model such that the X-ray projection images image the volume of interest fully in terms of data for the reconstruction of the 3D image dataset. In particular, the acquisition trajectory may be determined based on the planning image data and/or the planning model such that the X-ray projection images satisfy the Tuy condition. Alternatively, or additionally, the acquisition trajectory may be determined such that the X-ray projection images image the volume of interest from a predefined angle range, and/or interfering objects are avoided. Furthermore, the acquisition trajectory may be determined such that the acquisition arrangement is able to move to this, in particular without obstruction.

In a further advantageous embodiment of the proposed method, the determining of the volume of interest and/or of the acquisition trajectory may be based on artificial intelligence and/or, in particular manual, annotation of the planning image data and/or of the planning model as input data.

In particular, the volume of interest and/or the acquisition trajectory may be determined by applying a first trained function to input data. The input data may be based on the pre-captured planning image data and/or the planning model, in particular may include the planning image data and/or the planning model. In addition, the first trained function may provide the volume of interest and/or the acquisition trajectory as output data. The first trained function may be trained by a machine learning method. In particular, the first trained function may be a neural network, in particular a convolutional neural network (CNN) or a network including a convolutional layer.

The first trained function maps input data onto output data. The output data may also depend on one or more parameters of the first trained function. The one or more parameters of the first trained function may be determined and/or adapted by training. Determining and/or adapting the one or more parameters of the first trained function may be based in particular on a pair composed of training input data and associated training output data, in particular comparison output data, wherein the first trained function is applied to the training input data to generate training mapping data. In particular, the determining and/or adapting may be based on a comparison of the training mapping data and the training output data, in particular the comparison output data. A trainable function, (i.e., a function containing one or more parameters yet to be adapted), may also referred to as a trained function.

Other terms for trained functions are trained mapping rule, mapping rule containing trained parameters, function containing trained parameters, algorithm based on artificial intelligence, and machine-learning algorithm. An example of a trained function is an artificial neural network, where the edge weights of the artificial neural network are equivalent to the parameters of the trained function. The term "neural net" may also be used instead of the term "neural network." In particular, a trained function may also be a deep artificial neural network (deep neural network). Another example of a trained function is a "support vector machine," and in particular other machine-learning algorithms may also be used as the trained function.

The first trained function, in particular the first neural network, advantageously includes an input layer and an output layer. The input layer of the first trained function may be configured to receive the input data. In addition, the output layer may be configured to provide mapping data, in particular output data. In addition, the input layer and/or the output layer may each include a plurality of channels, in particular neurons.

Advantageously, at least one parameter of the first trained function may be adapted based on a comparison of a training volume-of-interest with a comparison volume-of-interest and/or a comparison of a training acquisition-trajectory with a comparison acquisition-trajectory.

Alternatively, or additionally, the volume of interest and/or the acquisition trajectory may be determined based on, in particular manual, annotation of the planning image data, and/or of the planning model as input data. A user input by a medical operator may be captured for this purpose, for instance by an input unit, in particular relating to a graphical depiction of the planning image data and/or of the planning model. The annotation may include a 2D or 3D spatially resolved marking, (e.g., a contour and/or surface and/or one or more points), of the volume of interest. Alternatively, or additionally, at least one point inside the volume of interest may be annotated manually by the user input, and the volume of interest identified automatically, for instance by an algorithm based on region growing. Alternatively, or additionally, the user input may be used to identify a spatial region, in particular a bounding box, in the planning image data and/or the planning model, in particular in the graphical depiction of the planning image data and/or of the planning model. The volume of interest is identified automatically inside the spatial region, for instance by a region-shrinking algorithm. Advantageously, the acquisition trajectory, in particular the plurality of acquisition positionings, may be determined based on the volume of interest, in particular automatically. In this case, the acquisition positionings are determined such that the volume of interest may be imaged from at least two different, in particular non-collinear, projection directions in the X-ray projection images to be acquired, in order to provide that the 3D image dataset may be reconstructed in 3D from the X-ray projection images.

Alternatively, or additionally, the acquisition trajectory, in particular the acquisition positionings, may be determined based on the, in particular manual, annotation of the planning image data and/or of the planning model as input data. The annotation may include a 2D or 3D spatially resolved specification, for instance a contour and/or surface and/or one or more points and/or a vector, relating to the planning image data and/or the planning model, which specifies or excludes an angle range for the projection directions of the X-ray projection images to be acquired.

The proposed embodiment may advantageously allow the volume of interest and/or the acquisition trajectory to be determined flexibly based on the planning image data and/or the planning model.

In a further advantageous embodiment of the proposed method, act a) may include acquiring at least one initial X-ray projection image of the object under examination in accordance with an initial acquisition plan. The volume of interest and/or the acquisition trajectory may be determined in this case based on the at least one initial X-ray projection image.

The acquiring of the at least one first X-ray projection image, in particular a plurality of first X-ray projection images of the object under examination may be performed in particular in a similar way to the acquisition of the X-ray projection images by the acquisition arrangement. Advantageously, the initial acquisition plan may have at least one initial acquisition positioning, in particular a plurality of initial acquisition positionings, and at least one initial collimator configuration, in particular an initial collimator configuration for each of the initial acquisition positionings. Advantageously, the acquisition arrangement may be arranged for acquiring the at least one initial X-ray projection image at the at least one initial acquisition positioning. The X-ray source may emit at each of the at least one acquisition positionings an X-ray beam for passing through the object under examination and for illuminating the X-ray detector. In this process, the collimation unit, in particular the arrangement of the at least one filter element, may be adjusted according to the initial collimator configuration. The X-ray detector, in particular the detector pixels, may provide the capture signal according to the detected X-rays. The at least one initial X-ray projection image may then be received by the capture signal. In particular, the at least one initial X-ray projection image may be provided as the pre-captured planning image data of the object under examination. The volume of interest and/or the acquisition trajectory may be determined based on the at least one initial X-ray projection image, for example, based on artificial intelligence and/or, in particular manual, annotation, with the input data being based on the at least one X-ray projection image.

The proposed embodiment may facilitate particularly time-efficient, in particular dynamic, determination of the acquisition trajectory and/or volume of interest and determination of the collimator configurations.

In a further advantageous embodiment of the proposed method, acts a) to c) may be executed repeatedly. In the repeated execution of act a), the X-ray projection images acquired so far may be provided as the first X-ray projection images, and the most recently identified acquisition plan may be provided as the initial acquisition plan.

Advantageously, acts a) to c) may be executed repeatedly, in particular until a termination condition occurs. For example, the termination condition may specify a maximum number of repetitions. When acts a) to c) are executed for the first time, the at least one initial X-ray projection image of the object under examination may be acquired in accordance with the initial acquisition plan. In this case, the initial acquisition plan may be identified, in particular received, in act a). In act b), the initial collimator configuration may be determined, in particular based on the initial acquisition plan. In addition, in act c), the at least one initial X-ray projection image may be acquired by the acquisition arrangement in accordance with the initial acquisition plan.

In the repeated execution of act a), the X-ray projection images acquired so far may be provided as the initial X-ray projection images, and the most recently identified acquisition plan may be provided as the initial acquisition plan.

The proposed embodiment may facilitate repeated, in particular dynamic, determination, in particular checking, of the acquisition trajectory and/or volume of interest and determination of the collimator configurations.

In a further advantageous embodiment of the proposed method, the determining of the volume of interest and/or of the acquisition trajectory may be based on artificial intelligence and/or, in particular manual, annotation of the at least one initial X-ray projection image as input data.

Advantageously, the volume of interest and/or the acquisition trajectory may be determined by applying a second trained function to the input data. The second trained function may have all the features and properties that were described with reference to the first trained function, and vice versa. The input data of the second trained function may be based on the at least one initial X-ray projection image, in particular may include the at least one initial X-ray projection image. In addition, the second trained function may provide the volume of interest and/or the acquisition trajectory as output data.

Alternatively, or additionally, the volume of interest and/or the acquisition trajectory may be based on annotation, (e.g., manual annotation), of the at least one initial X-ray projection image as input data. A user input by a medical operator may be captured for this purpose, for instance by the input unit, in particular relating to a graphical depiction of the at least one initial X-ray projection image. The annotation may include a 2D or 3D spatially resolved marking, (e.g., a contour and/or surface and/or one or more points), of the volume of interest. A user input by a medical operator may be captured for this purpose, for instance by an input unit, in particular relating to a graphical depiction of the at least one initial X-ray projection image. The annotation may include a 2D or 3D spatially resolved marking, (e.g., a contour and/or surface and/or one or more points), of the volume of interest. Alternatively, or additionally, at least one point inside the volume of interest may be annotated manually by the user input, and the volume of interest identified automatically in the at least one initial X-ray projection image, for instance by an algorithm based on region growing. Alternatively, or additionally, the user input may be used to identify a spatial region, in particular a bounding box, in the at least one initial X-ray projection image, in particular in the graphical depiction of the at least one initial X-ray projection image, wherein the volume of interest is identified automatically inside the spatial region, for instance by a region-shrinking algorithm. Advantageously, the acquisition trajectory, in particular the plurality of acquisition positionings, may be determined based on the volume of interest, in particular automatically. In this case, the acquisition positionings are determined such that the volume of interest may be imaged from at least two different, in particular non-collinear, projection directions in the X-ray projection images to be acquired, in order to provide that the 3D image dataset may be reconstructed in 3D from the X-ray projection images.

Alternatively, or additionally, the acquisition trajectory, in particular the acquisition positionings, may be determined based on the, in particular manual, annotation of the at least one initial X-ray projection image as input data. The annotation may include a 2D or 3D spatially resolved specification, for instance a contour and/or surface and/or one or more points and/or a vector, relating to the at least one initial X-ray projection image, which specifies or excludes an angle range for the projection directions of the X-ray projection images to be acquired.

The proposed embodiment may advantageously allow the volume of interest and/or the acquisition trajectory to be determined dynamically based on at least one initial X-ray projection image.

In a further advantageous embodiment of the proposed method, act a) may include identifying at least one X-ray sensitive region of the object under examination. In this case, the collimator configurations may specify the spatial arrangement of the at least one filter element additionally such that X-ray radiation that may be emitted by the X-ray source and travels at least partially inside the X-ray sensitive region is filtered.

Advantageously, the acquisition plan may include information relating to the at least one X-ray sensitive region, in particular to a plurality of X-ray sensitive regions, of the object under examination. If pre-captured planning image data and/or a planning model of the object under examination is received in act a), or if at least one initial X-ray projection image of the object under examination is acquired in act a), then the at least one X-ray sensitive region may be identified in the planning image data, the planning model or the at least one initial X-ray projection image, for instance by segmentation and/or by artificial intelligence and/or by, in particular manual or automatic, annotation. Advantageously, an anatomical object and/or an anatomical structure may be identified as the at least one X-ray sensitive region of the object under examination, for instance an eye and/or eye lens of the object under examination. Alternatively, or additionally, an object, for instance a medical object, in particular an implant and/or a medical instrument, that is arranged in or on the object under examination and may cause an artifact, for example, a scattered radiation artifact and/or a metal artifact, in the X-ray projection images to be acquired, may be identified as the at least one X-ray sensitive region.

Advantageously, the collimator configurations may specify the spatial arrangement of the at least one filter element, in particular of the plurality of filter elements, additionally such that the X-rays that travel at least partially, in particular completely, inside the X-ray sensitive region are filtered, in particular blocked. An X-ray dose to the at least one X-ray sensitive region may thereby be minimized advantageously, and the volume of interest may be imaged in the X-ray projection images.

In a further advantageous embodiment of the proposed method, the acquisition trajectory may include a rotation of the acquisition arrangement about an axis of rotation.

Advantageously, the acquisition trajectory may specify a rotation of the acquisition arrangement about the axis of rotation, in particular a center of rotation and/or isocenter. In this case, the plurality of acquisition positionings of the acquisition arrangement may be arranged along a substantially circular acquisition trajectory and/or along a substantially helical acquisition trajectory. In addition, the acquisition trajectory may include a translation of the acquisition arrangement, in particular at least partially along the axis of rotation.

The proposed embodiment may advantageously allow the 3D image dataset, including the image of the volume of interest, to be reconstructed in 3D from the X-ray projection images.

In a second aspect, the disclosure relates to a medical X-ray device including an acquisition arrangement. The acquisition arrangement includes an X-ray source, an X-ray detector, and a collimation unit. The medical X-ray device is configured to perform a proposed computer-implemented method for providing a 3D image dataset.

The advantages of the proposed X-ray device are similar to the advantages of the proposed method for providing a 3D image dataset. Features, advantages, or alternative embodiments mentioned in this connection may also be applied to the other claimed subject matter, and vice versa.

The acquisition arrangement may be configured to be arranged, in particular sequentially in time, along the acquisition trajectory, in particular at the acquisition positionings. For this purpose, the acquisition arrangement may be mounted for movement, in particular for translation and/or rotation.

The X-ray source may be configured to emit, in particular at the acquisition positionings, an X-ray beam for passing through the volume of interest and for illuminating the X-ray detector. In this process, the collimation unit, in particular the arrangement of the at least one filter element, may be configured to be adjusted according to the collimator configurations at the acquisition positionings of the acquisition trajectory. The X-ray detector, in particular the detector pixels, may be configured to detect the X-rays after interaction with the object under examination, and to provide the capture signal according to the detected X-rays. The acquisition arrangement may be configured for cone-beam computed tomography, for example.

In a third aspect, the disclosure relates to a computer program product including a computer program, which may be loaded directly into a memory of a provider unit, and which contains program segments in order to perform all the acts of the proposed method for providing a 3D image dataset when the program segments are executed by the provider unit. The computer program product may include software containing a source code, which still needs to be compiled and linked or just needs to be interpreted, or an executable software code, which for execution only needs to be loaded into the provider unit. The computer-implemented method for providing a 3D image dataset by a provider unit may be performed quickly, reproducibly and robustly by the computer program product. The computer program product is configured such that it may perform the method acts by the provider unit. Such a computer program product may include, in addition to the computer program, if applicable, extra elements, (e.g., documentation and/or extra components), and also hardware components, (e.g., hardware keys (dongles etc.)), for using the software.

The advantages of the proposed computer program product are similar to the advantages of the proposed method for providing a 3D image dataset. Features, advantages, or alternative embodiments mentioned in this connection may also be applied to the other claimed subject matter, and vice versa.

The disclosure may also be based on a computer-readable storage medium and/or electronically readable data carrier, on which are stored program segments which may be read and executed by a provider unit in order to perform all the acts of the method for providing a 3D image dataset when the program segments are executed by the provider unit. An implementation largely in software has the advantage that even provider units already in use may be easily upgraded by a software update in order to work in the manner according to the disclosure.

BRIEF DESCRIPTION OF THE DRAWINGS

Embodiments of the disclosure are described in more detail below and illustrated in the drawings. The same reference signs are used for the same features in different figures, in which.

DETAILED DESCRIPTION

Figure 1:
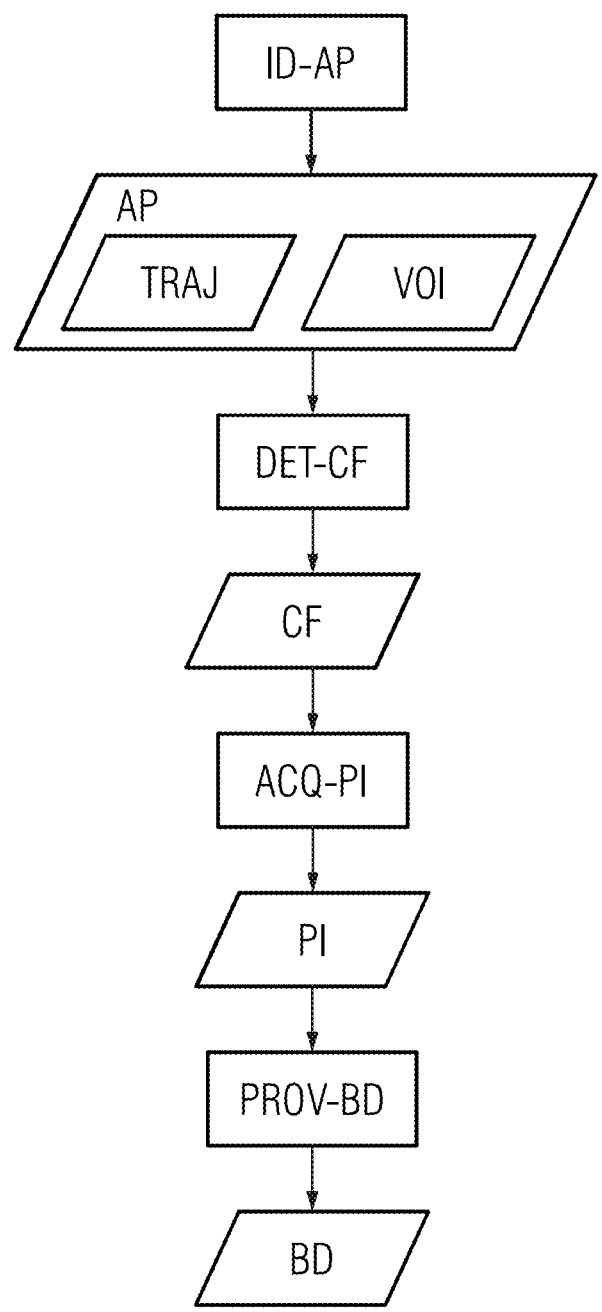
FIG. 1 to 4 show schematic representations of different embodiments of a method for providing a 3D image dataset.

FIG. 1 shows schematically an advantageous embodiment of a proposed method for providing PROV-BD a 3D image dataset BD. In act a), an acquisition plan AP may be identified ID-AP including information relating to a volume of interest VOI to be imaged of an object under examination and relating to an acquisition trajectory TRAJ. The acquisition trajectory TRAJ may specify a plurality of acquisition positionings of an acquisition arrangement for acquiring X-ray projection images ACQ-PI of the object under examination. Advantageously, the acquisition trajectory TRAJ may include a rotation of the acquisition arrangement about an axis of rotation. Advantageously, the acquisition arrangement may include an X-ray source, an X-ray detector, and a collimation unit. The X-ray detector may have a plurality of detector rows, each row including a plurality of detector pixels. In act b), a collimator configuration CF of the collimation unit may be determined DET-CF for each of the acquisition positionings of the acquisition arrangement. The collimator configurations CF may each specify a spatial arrangement of at least one filter element of the collimation unit such that X-ray radiation that may be emitted by the X-ray source and illuminate a detector row without earlier passing through the volume of interest VOI is filtered, and such that X-ray radiation that may be emitted by the X-ray source and illuminate at least part of a detector row after passing through the volume of interest VOI is transmitted. In act c), the X-ray projection images PI of the object under examination may be acquired ACQ-PI by the acquisition arrangement in accordance with the acquisition plan AP. In this process, the collimation unit may be adjusted based on the collimator configurations CF. In act d), the 3D image dataset BD may be provided PROV-BD by reconstruction from the X-ray projection images PI.

Advantageously, the collimation unit may have at least one at least semi-transparent filter element and at least one non-transparent filter element. The X-ray radiation may be filtered by the at least one non-transparent filter element and transmitted by the at least one at least semi-transparent filter element. In particular, the collimation unit may have a plurality of filter elements. The collimator configurations CF in this case may each specify a relative positioning of the plurality of filter elements.

Figure 2:
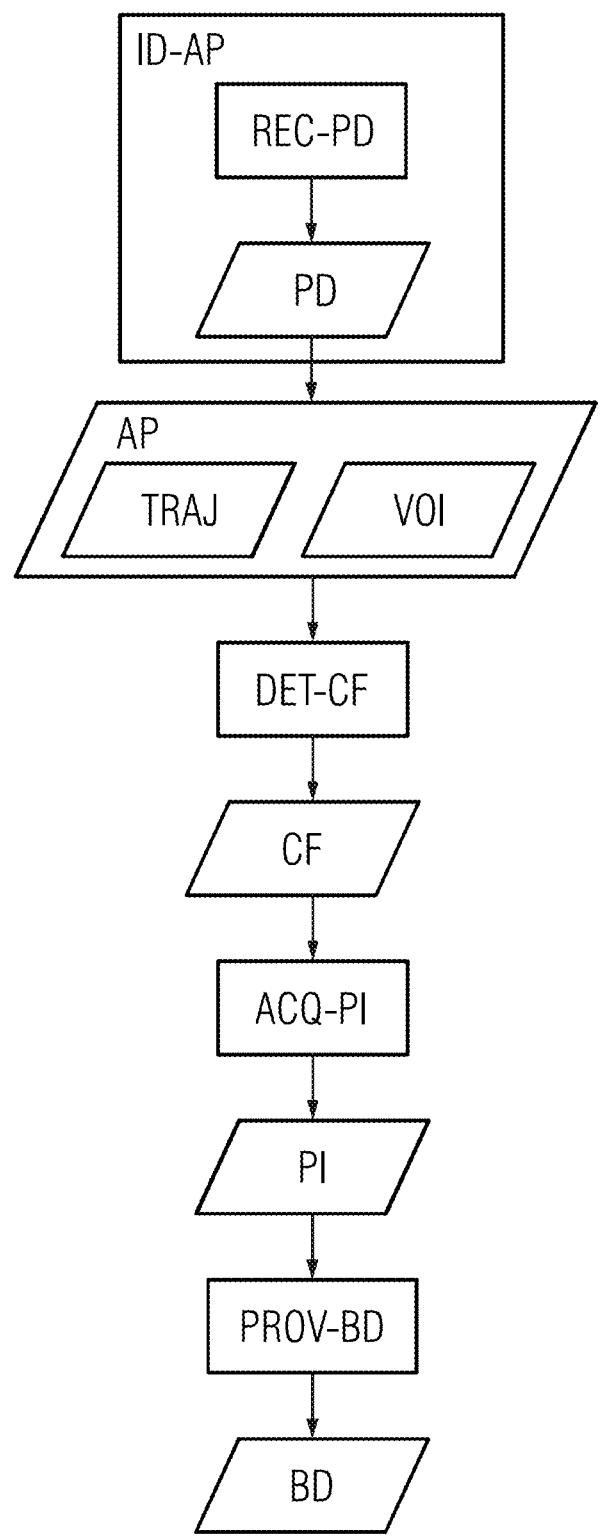

FIG. 2 shows a schematic representation of a further advantageous embodiment of a proposed method for providing a 3D image dataset PROV-BD. In this case, act a) may include receiving REC-PD pre-captured planning image data and/or a planning model PD of the object under examination. The volume of interest VOI and/or the acquisition trajectory TRAJ may be determined based on the planning image data and/or the planning model PD. The determining of the volume of interest VOI and/or of the acquisition trajectory TRAJ may be based on artificial intelligence and/or, in particular manual, annotation of the planning image data and/or of the planning model PD as input data.

Figure 3:
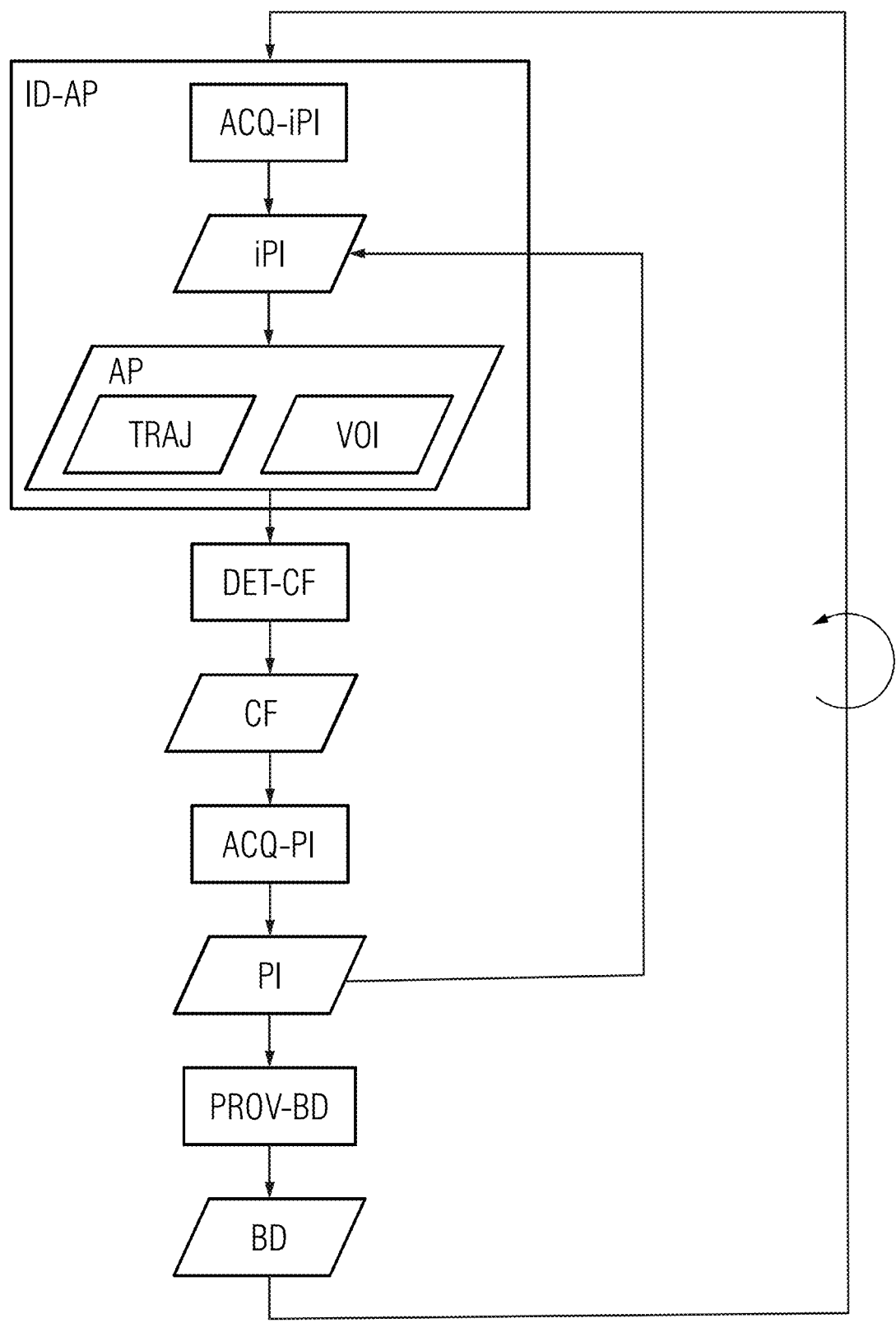

FIG. 3 shows schematically a further advantageous embodiment of a proposed method for providing a 3D image dataset PROV-BD. In this case, act a) may include acquiring ACQ-iPI at least one initial X-ray projection image iPI of the object under examination in accordance with an initial acquisition plan. In addition, the volume of interest VOI and/or the acquisition trajectory TRAJ may be determined based on the at least one initial X-ray projection image iPI. Advantageously, acts a) to c) may be executed repeatedly. In this process, the X-ray projection images PI acquired so far may be provided in the repeated execution of act a) as the initial X-ray projection images iPI, and the most recently identified acquisition plan AP may be provided as the initial acquisition plan. Advantageously, the determining of the volume of interest VOI and/or of the acquisition trajectory TRAJ may be based on artificial intelligence and/or, in particular manual, annotation of the at least one initial X-ray projection image iPI as input data.

Figure 4:
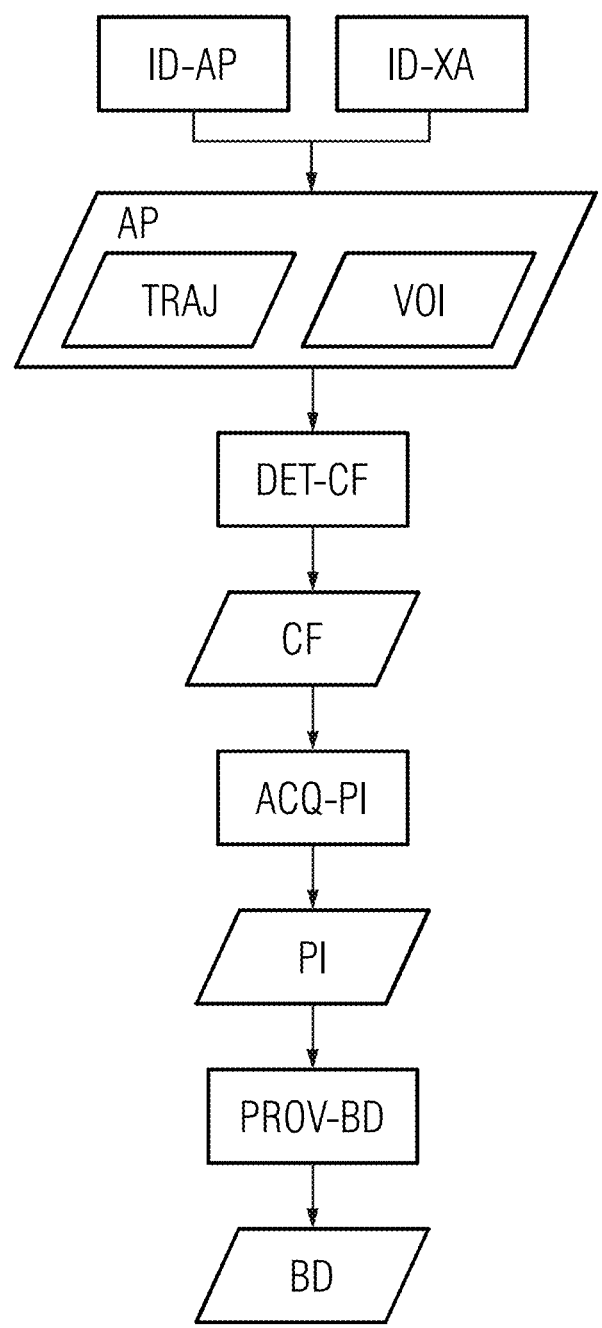

FIG. 4 shows a schematic representation of a further advantageous embodiment of a proposed method for providing a 3D image dataset PROV-BD. In this case, act a) may further include identifying ID-XA at least one X-ray sensitive region XA of the object under examination. Advantageously, the collimator configurations CF may specify the spatial arrangement of the at least one filter element additionally such that X-ray radiation that travels at least partially inside the X-ray sensitive region XA is filtered.

Figure 5:
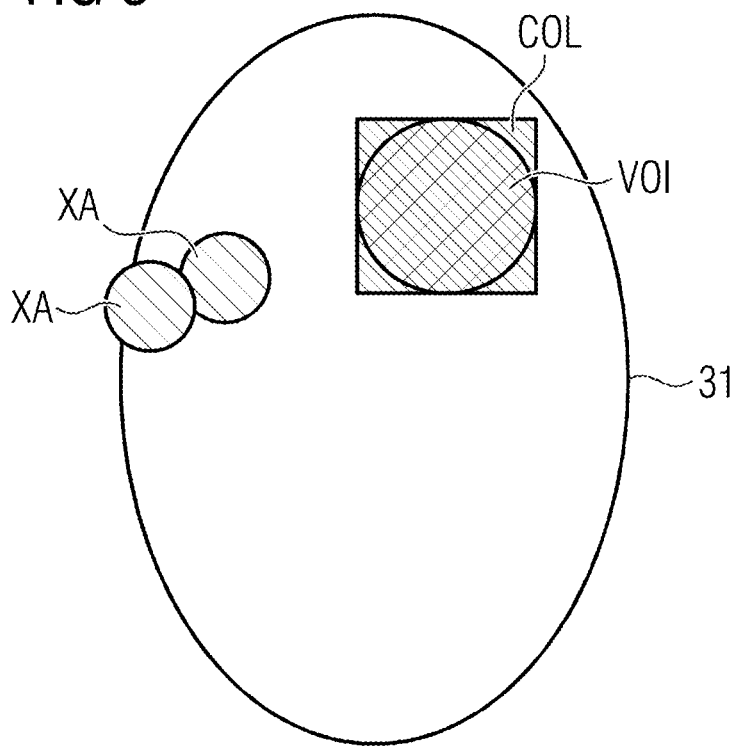
FIGS. 5 and 6 show schematic representations of examples of different collimator configurations.
Figure 6:
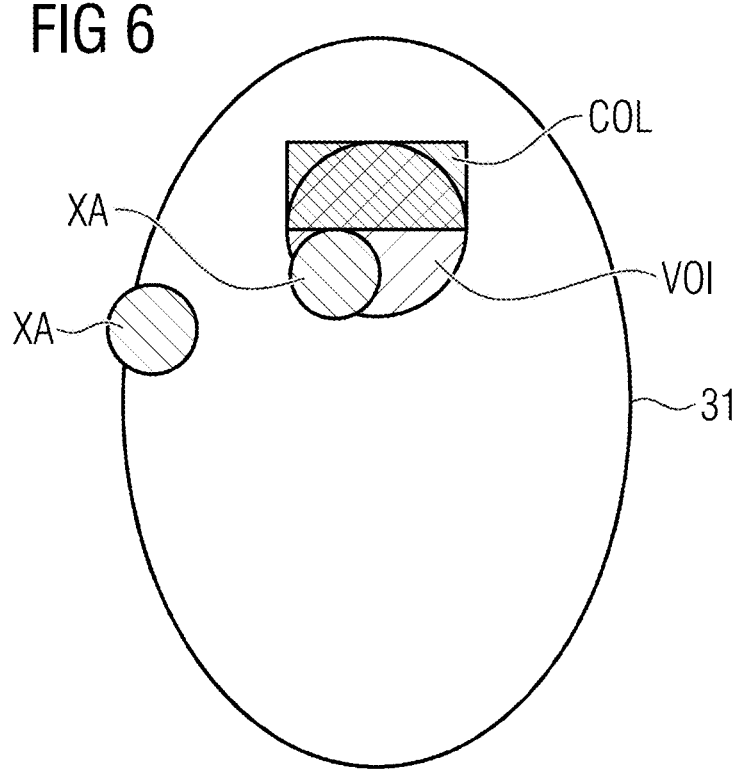

FIG. 5 and FIG. 6 show schematically collimator configurations CF for two different acquisition positionings of the acquisition arrangement with respect to the object under examination 31, in particular the volume of interest ROI. In act a), the eyes of the object under examination, for example, may be identified ID-XA as X-ray sensitive regions XA, for instance in the registered planning model, in particular a model of the head, of the object under examination 31. When specifying the spatial arrangement of the at least one filter element of the collimation unit such that X-ray radiation that may be emitted by the X-ray source and illuminates a detector row without earlier passing through the volume of interest VOI is filtered, and such that X-ray radiation that may be emitted by the X-ray source and illuminates at least part of a detector row after passing through the volume of interest VOI is transmitted, a rectangular transmission window COL, for example, may be determined DET-CF as the collimator configuration CF for the acquisition positionings shown in FIG. 5. The spatial arrangement of the X-ray sensitive regions XA with respect to the volume of interest VOI means that in this case there is no need to restrict the transmission window COL further.

In FIG. 6, on the other hand, if X-rays were to pass through the entire volume of interest VOI, these would also pass through at least part of one of the X-ray sensitive regions XA. Advantageously, the collimator configuration CF may specify for the acquisition positioning shown in FIG. 6 the spatial arrangement of the at least one filter element additionally such that the X-ray radiation that may be emitted by the X-ray source and travels at least partially inside the X-ray sensitive region XA is filtered. The transmission window COL may thereby be reduced in size compared with the transmission window shown in FIG. 5. The X-ray sensitive regions XA, however, may be protected from X-ray radiation. In the reconstruction of the 3D image dataset from the X-ray projection images PI, the missing region of the transmission window COM may be augmented, for the purpose of imaging the volume of interest VOI, by an X-ray projection image PI from another acquisition positioning, for example, the acquisition positioning of FIG. 5.

Figure 7:
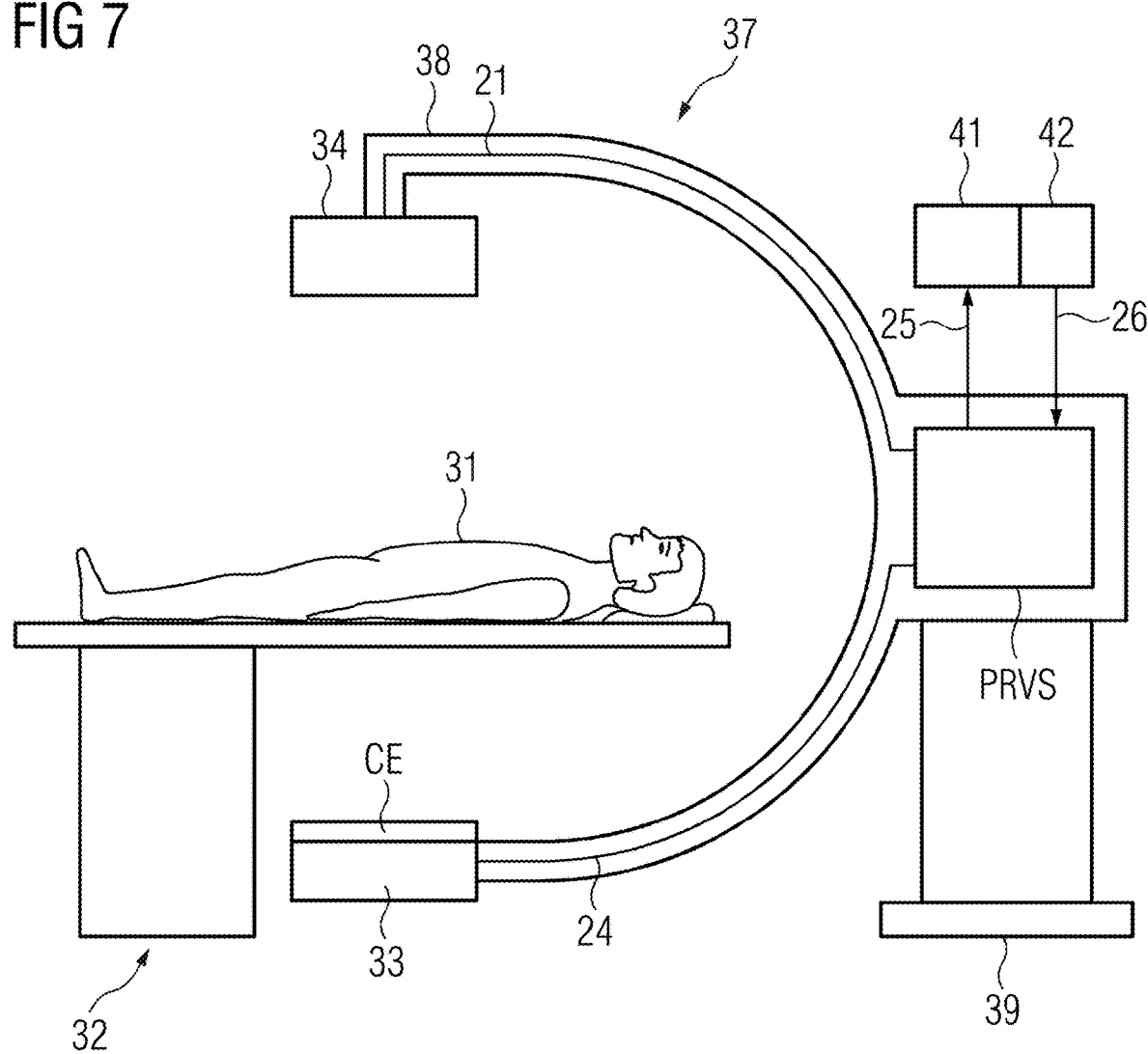
FIG. 7 shows a schematic representation of an example of a medical X-ray device.

FIG. 7 shows a schematic representation of a proposed medical X-ray device, in particular a C-arm X-ray device 37, including an acquisition arrangement, which acquisition arrangement includes an X-ray source 33, an X-ray detector 34, and a collimation unit CE. The X-ray source 33 and the X-ray detector 34 may be arranged in a defined arrangement on a C-arm 38. The C-arm 38 of the C-arm X-ray device 37 may be mounted for movement about one or more axes. For the purpose of acquiring the X-ray projection images PI of the object under examination 31, which is positioned on a patient positioning apparatus 32, a provider unit PRVS may send a signal 24 to the X-ray source 33. Thereupon, the X-ray source 33 may emit an X-ray beam. The collimation unit CE may be adjusted based on the collimator configurations CF in the respective acquisition positionings of the C-arm X-ray device 37. The at least one filter element of the collimation unit CE may filter, if applicable, the X-ray radiation emitted by the X-ray source. When the X-ray beam, after interacting with the object under examination 31, in particular the volume of interest VOI, hits a surface of the X-ray detector 34, in particular the detector pixels, the X-ray detector 34 may send a signal 21 to the provider unit PRVS. The provider unit PRVS may capture the X-ray projection images PI by the signal 21. In addition, the provider unit PRVS may provide PROV-BD the 3D image dataset BD by reconstruction from the X-ray projection images PI.

The medical X-ray device may also have an input unit 42, for example, a keyboard, and a display unit 41, for example, a monitor and/or a display and/or a projector. The input unit 42 may be integrated in the display unit 41, for example, when there is a capacitive and/or resistive input display. The input unit 42 may be configured advantageously to capture a user input. For example, for this purpose, the input unit 42 may send a signal 26 to the provider unit PRVS. The provider unit PRVS may be configured to be controlled according to user input, in particular the signal 26, in particular in order to perform a method for providing a 3D image dataset PROV-BD. The display unit 41 may be configured advantageously to display a graphical depiction of the X-ray projection images PI and/or of the 3D image dataset BD. For this purpose, the provider unit PRVS may send a signal 25 to the display unit 41. In an advantageous embodiment, the display unit 41 may also be configured to display a graphical depiction of the pre-captured planning image data and/or of the planning model PD of the object under examination 31, or of the initial X-ray projection image iPI.

The schematic representations contained in the described figures are not shown to scale in any way and do not depict relative sizes.

In the context of the present application, the expressions "based on" and "based on" may be understood in particular in the sense of the expression "using." In particular, any wording, according to which a first feature is produced (or obtained, defined, etc.) based on a second feature, does not exclude the possibility that the first feature is produced (or obtained, defined, etc.) based on a third feature.

Finally, it should be reiterated that the above methods described in detail and the presented devices are merely embodiments, which may be modified by a person skilled in the art in many ways without departing from the scope of the disclosure. In addition, the use of the indefinite article "a" or "an" does not rule out the possibility of there also being more than one of the features concerned. Likewise, the terms "unit" and "element" do not exclude the possibility that the components in question include a plurality of interacting sub-components, which may also be spatially distributed if applicable.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for providing a three-dimensional (3D) image dataset, the method comprising:
    identifying an acquisition plan comprising information relating to a volume of interest to be imaged of an object under examination and relating to an acquisition trajectory, wherein the acquisition trajectory specifies a plurality of acquisition positionings of an acquisition arrangement for acquiring X-ray projection images of the object under examination, wherein the acquisition arrangement comprises an X-ray source, an X-ray detector, and a collimation unit, and wherein the X-ray detector has a plurality of detector rows, each detector row comprising a plurality of detector pixels;
    determining a collimator configuration of the collimation unit for each acquisition positioning of the acquisition positionings of the acquisition arrangement, wherein each collimator configuration specifies a spatial arrangement of at least one filter element of the collimation unit such that: (1) X-ray radiation that is emitted by the X-ray source and configured to illuminate a detector row without earlier passing through the volume of interest is filtered by one or more filter elements of the at least one filter element, and (2) X-ray radiation that is emitted by the X-ray source and configured to illuminate at least part of the detector row after passing through the volume of interest is transmitted;
    acquiring the X-ray projection images of the object under examination by the acquisition arrangement in accordance with the acquisition plan, wherein the collimation unit is adjusted based on the collimator configurations; and
    providing the 3D image dataset by reconstruction from the X-ray projection images.

2. The method of claim 1, wherein the collimation unit has at least one at least semi-transparent filter element and at least one non-transparent filter element,
    wherein the X-ray radiation is filtered by the at least one non-transparent filter element and transmitted by the at least one at least semi-transparent filter element.

3. The method of claim 2, wherein the collimation unit has a plurality of filter elements, and
    wherein each collimator configuration of the collimator configurations specifies a relative positioning of the plurality of filter elements.

4. The method of claim 3, wherein the identifying of the acquisition plan comprises receiving pre-captured planning image data and/or a planning model of the object under examination, and
    wherein the volume of interest and/or the acquisition trajectory are determined based on the planning image data and/or the planning model.

5. The method of claim 4, wherein the determining of the volume of interest and/or the determining of the acquisition trajectory is based on one or more of artificial intelligence, annotation of the planning image data, annotation of the planning model as input data.

6. The method of claim 1, wherein the collimation unit has a plurality of filter elements, and
    wherein each collimator configuration of the collimator configurations specifies a relative positioning of the plurality of filter elements.

7. The method of claim 1, wherein the identifying of the acquisition plan comprises receiving pre-captured planning image data and/or a planning model of the object under examination, and wherein the volume of interest and/or the acquisition trajectory are determined based on the planning image data and/or the planning model.

8. The method of claim 7, wherein the determining of the volume of interest and/or the determining of the acquisition trajectory is based on one or more of artificial intelligence, annotation of the planning image data, annotation of the planning model as input data.

9. The method of claim 1, wherein the identifying of the acquisition plan comprises acquiring at least one initial X-ray projection image of the object under examination in accordance with an initial acquisition plan, and wherein the volume of interest and/or the acquisition trajectory are determined based on the at least one initial X-ray projection image.

10. The method of claim 9, wherein the identifying of the acquisition plan, the determining of the collimator configurations, and the acquiring of the at least one X-ray projection image are executed repeatedly, wherein, in the repeated execution of the identifying of the acquisition plan, the X-ray projection images acquired so far are provided as the at least one initial X-ray projection image, and a most recently identified acquisition plan is provided as the initial acquisition plan.

11. The method of claim 10, wherein the determining of the volume of interest and/or of the acquisition trajectory is based on one or both of artificial intelligence and annotation of the at least one initial X-ray projection image as input data.

12. The method of claim 9, wherein the determining of the volume of interest and/or of the acquisition trajectory is based on one or both of artificial intelligence or annotation of the at least one initial X-ray projection image as input data.

13. The method of claim 1, wherein the identifying of the acquisition plan comprises identifying at least one X-ray sensitive region of the object under examination, and wherein the collimator configurations specify the spatial arrangement of the at least one filter element additionally such that X-ray radiation that is emitted by the X-ray source and travels at least partially inside the X-ray sensitive region is filtered.

14. The method of claim 1, wherein the acquisition trajectory comprises a rotation of the acquisition arrangement about an axis of rotation.

15. A medical X-ray device comprising:

an acquisition arrangement having an X-ray source, an X-ray detector, and a collimation unit, wherein the collimation unit comprises at least one filter element, wherein the X-ray detector has a plurality of detector rows, each detector row comprising a plurality of detector pixels, and wherein the medical X-ray device is configured to:

identify an acquisition plan comprising information relating to a volume of interest to be imaged of an object under examination and relating to an acquisition trajectory, wherein the acquisition trajectory specifies a plurality of acquisition positionings of the acquisition arrangement for acquiring X-ray projection images of the object under examination;

determine a collimator configuration of the collimation unit for each acquisition positioning of the acquisition positionings of the acquisition arrangement, wherein each collimator configuration specifies a spatial arrangement of the at least one filter element of the collimation unit such that: (1) X-ray radiation that is emitted by the X-ray source and configured to illuminate a detector row without earlier passing through the volume of interest is filtered by one or more filter elements of the at least one filter element, and (2) X-ray radiation that is emitted by the X-ray source and configured to illuminate at least part of the detector row after passing through the volume of interest is transmitted;

acquire the X-ray projection images of the object under examination by the acquisition arrangement in accordance with the acquisition plan, wherein the collimation unit is adjusted based on the collimator configurations; and provide a three-dimensional (3D) image dataset by reconstruction from the X-ray projection images.

16. A non-transitory computer readable medium comprising a computer program, which is configured to be loaded directly into a memory of a provider unit, and which contains program segments that, when executed by the provider unit, are configured to cause the provider unit to:

identify an acquisition plan comprising information relating to a volume of interest to be imaged of an object under examination and relating to an acquisition trajectory, wherein the acquisition trajectory specifies a plurality of acquisition positionings of an acquisition arrangement for acquiring X-ray projection images of the object under examination, wherein the acquisition arrangement comprises an X-ray source, an X-ray detector, and a collimation unit, and wherein the X-ray detector has a plurality of detector rows, each detector row comprising a plurality of detector pixels;

determine a collimator configuration of the collimation unit for each acquisition positioning of the acquisition positionings of the acquisition arrangement, wherein each collimator configuration specifies a spatial arrangement of at least one filter element of the collimation unit such that: (1) X-ray radiation that is emitted by the X-ray source and configured to illuminate a detector row without earlier passing through the volume of interest is filtered by one or more filter elements of the at least one filter element, and (2) X-ray radiation that is emitted by the X-ray source and configured to illuminate at least part of the detector row after passing through the volume of interest is transmitted;

acquire the X-ray projection images of the object under examination by the acquisition arrangement in accordance with the acquisition plan, wherein the collimation unit is adjusted based on the collimator configurations; and provide a three-dimensional (3D) image dataset by reconstruction from the X-ray projection images.

* * * * *